United States Patent Office 2,961,849
Patented Nov. 29, 1960

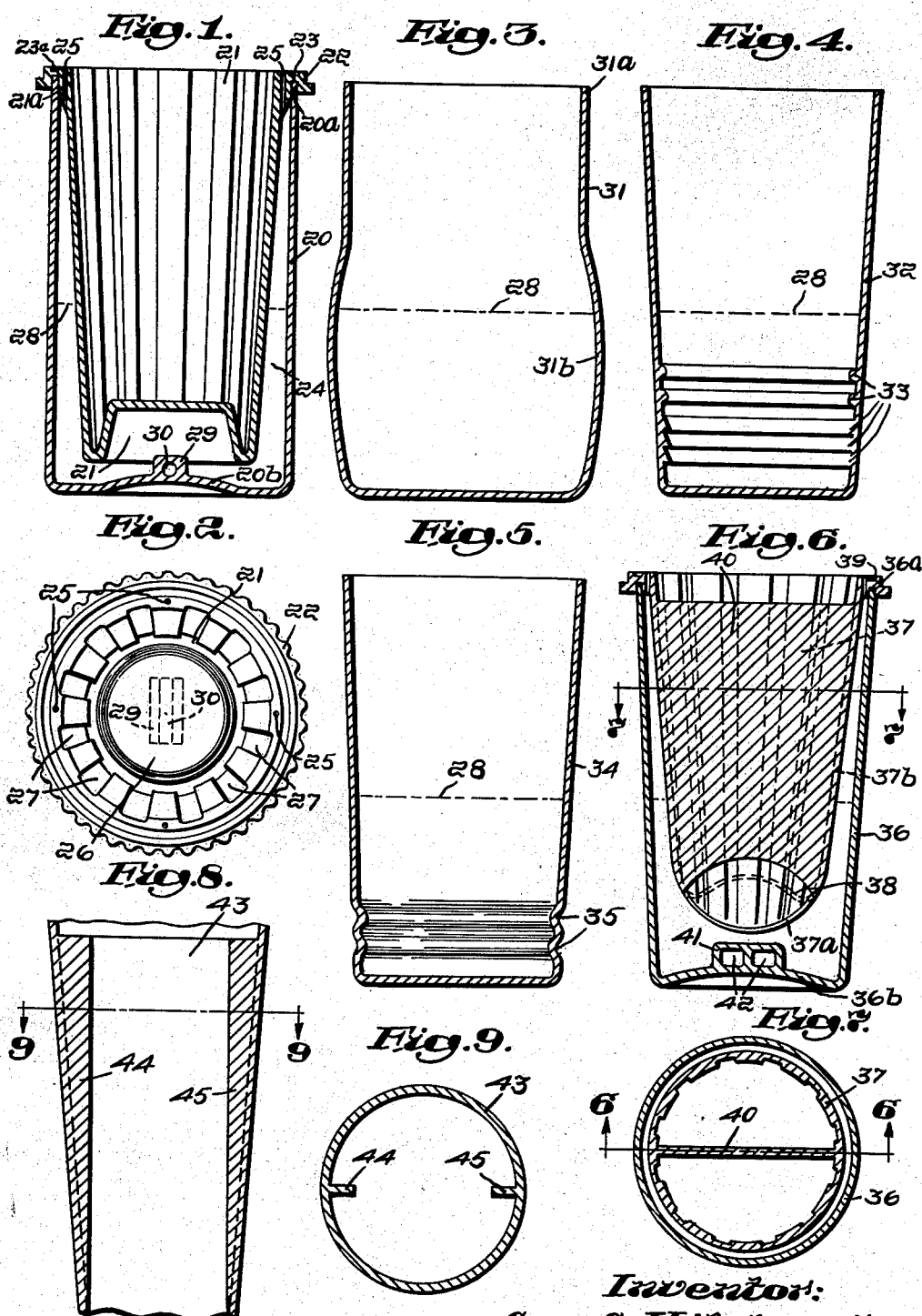

2,961,849
MOLD FOR FORMING ICE LINERS IN CONTAINERS

Guy C. Hitchcock, 1612 19th St. NW., Washington, D.C.

Filed June 4, 1956, Ser. No. 589,287

8 Claims. (Cl. 62—355)

This invention relates in general to ice molds and more particularly to a mold for forming a lining of ice in a drinking vessel or similar container.

The general object of this invention is to provide a mold by which a layer of ice can be formed on the interior of a drinking glass, bowl, or similar vessel which is to be used for serving chilled foods or beverages. Another object is to provide a mold insert which can be used in connection with conventional vessels for this purpose, which will produce linings of uniform shape, and which can be readily removed after the lining is frozen, leaving the latter intact in the vessel. Still another object is to provide means for preventing the lining from separating from the vessel and float upward when the vessel is filled with liquid.

The mold consists in general of a flexible waterproof insert, of a shape and size suitable to fit inside a vessel in spaced relationship to the bottom and side walls, having a grooved rim which fits tightly over the upper edge of the vessel. The vessel preferably has marks to indicate the correct level to which it should be filled with water for forming the lining. The vessel is filled to this level and the mold insert is then set in place and the assembled mold placed in a refrigerator. The mold insert is preferably provided with a vent to allow for escape of air and also has provision for accommodating expansion of the water during freezing. When the lining has been formed, the mold is removed. Preferably the vessel has internal projections or overhanging portions which become frozen into the lining and anchor it in place.

In the drawings illustrating the invention:

Fig. 1 is a vertical cross-section through an assembled mold constructed according to the invention;

Fig. 2 is a plan view of the assembled mold of Fig. 1;

Fig. 3 is a vertical cross-section of a modified form of vessel for use with the mold inserts here described;

Fig. 4 is a vertical cross-section of another form of the vessel;

Fig. 5 is a vertical cross-section of still another form of the vessel;

Fig. 6 is a vertical cross-section of an assembled mold illustrating a modified form of mold insert;

Fig. 7 is a cross-section taken along line 7—7 of Fig. 6;

Fig. 8 is a vertical cross-section, partly broken away, of another form of mold insert; and Fig. 9 is a cross-section taken along line 9—9 of Fig. 8.

The outer vessel 20 is illustrated in Figs. 1 and 2 as having the general shape of a drinking glass with an upper rim 20a and a slightly concave bottom 20b. This vessel may be made of glass, plastic, or other materials normally used for drinking vessels. The mold insert 21 is preferably made of a tough flexible material which tends to pull away readily from ice, for example, of a plastic such as polyethylene. The insert has an outwardly projecting top flange 22, on the under side of which is a groove 23 in which the rim 20a of the vessel is received. Preferably this groove is made a rather tight fit on the rim. The flange also has a groove 23a on its upper side directly above groove 23. The flange 22 may be scalloped or fluted around its outer edge to facilitate grasping.

The insert 21 tapers inward toward the bottom to form, with the outer vessel, a chamber 24. Near the top the insert may have a slightly thickened portion 21a which engages the inside of vessel 20 for a short distance down from the top edge to keep this portion of the vessel free of ice and form an even edge on the ice lining. The insert may have one or more vents 25 in this thickened portion. The insert has a bottom wall 26, of inverted U-shaped cross-section, which is spaced from the bottom wall 20b of the vessel. The insert preferably has vertical grooves 27 on the inside to allow the insert to contract and accommodate the expansion of the ice in chamber 24. Such grooves may likewise be provided on the outside of the insert.

The vessel is marked with an index line 28 to show the correct level for filling with water to form the ice lining. On the bottom wall 20b is a projection 29, with a transverse hole 30. To use the mold, the outer vessel 20 is filled with water to the level of line 28. The mold insert is then set into the vessel and flange 22 snapped over the rim. Line 28 is so placed that the amount of water in the vessel will be sufficient to substantially fill the chamber 24 between the mold insert and the glass. Some air is trapped under wall 26 and this allows for expansion of the water as it freezes. The mold is then set in the freezing compartment of a refrigerator, or quick freeze unit, and the water allowed to freeze. The resulting ice liner takes the shape of the space between the mold insert and the vessel.

To use the vessel, the flexible insert 21 is pulled out by grasping flange 22. If necessary, warm water can first be poured into the insert to loosen it from the ice lining. The water frozen in hole 30 forms a plug which holds the lining in the vessel as the insert is removed, and also prevents the lining from floating up when a beverage is poured into the lined vessel.

In Fig. 3, the outer vessel 31 is illustrated as having an upper rim 31a and an enlarged portion 31b toward the bottom. In Fig. 4, the vessel 32 has a number of inwardly projecting circumferential ridges 33 toward the bottom. In Fig. 5, the vessel 34 has circumferential corrugations 35, which form overhangs to prevent the ice lining from floating up. Any of these vessels may be filled with water to the index line 28 and assembled with the insert 21 of Fig. 1, with their upper rims engaged in groove 23.

In Fig. 6, a vessel 36 is shown assembled with a modified insert 37. This insert has a rounded bottom wall 37a which is somewhat thinner than the side walls 37b and will flex upward to assume the general shape of the dotted lines 38 under the expansion of the water in freezing. Insert 37 has a top flange 39 which is grooved on the under side to receive the top rim 36a of the vessel. The insert has a central partition 40 which is attached to the side walls but cut away at the bottom to allow for upward movement of the bottom wall. To remove the insert after the ice lining is formed, the partition 40 can be pulled sidewise or twisted, pulling the side walls in away from the ice. The vessel 36 is here shown as having on its bottom wall 36b, a projection with two holes 42 in which ice may freeze to form retaining plugs for the lining.

The insert 43 illustrated in Figs. 8 and 9 is similar to that of Figs. 1 and 2, except that it has a pair of vertically disposed internal fins 44 and 45, and has no vertical grooves. These fins can be grasped to twist the insert and free it from the ice lining.

Any of these inserts may be used with any of the forms of vessel shown, to produce a drinking vessel lined with ice. It is understood also that the shape and size of the vessel and insert may be varied for producing ice lined containers for foods other than beverages, for example to produce an ice lined bowl for chilled fruits. The projections for holding the ice in the vessel may be varied in shape and location, but it is preferable to place them in the region where the lining is thickest, so that they will remain effective for as long as possible as the ice melts. The air vents may be omitted, if desired, so that the assembled mold may be laid on its side or placed upside down for freezing.

When the air vents are omitted, the chamber 24 is vented by applying flange 22 progressively around the rim 20a. Groove 23a allows flange 22 to be snapped to an upright position, and a portion of the flange may thus remain up to the last so as to allow escape of air as the rest of the flange is being sealed progressively around the rim of the vessel. Groove 23a also facilitates stripping of the insert from the ice lining, as the insert can be more readily twisted after flange 22 has been snapped into an upright position.

It will be understood that the various features of the mold here shown can be combined in various ways.

What is claimed is:

1. A mold for forming an ice lining in a vessel having a bottom wall, a continuous side wall and a continuous top rim, comprising a hollow insert of flexible material adapted to fit within said vessel, said insert having a flange adapted to overlie said rim and provided with a groove adapted to engage said rim and hold the insert in position in the vessel, said insert having a continuous side wall and a bottom wall of such dimensions as to be spaced all around from the side wall and bottom wall, respectively, of the vessel when the insert is in position, and means projecting inward from the side wall of the insert and forming a partial partition across the interior of the insert and adapted to be grasped to flex the insert side wall.

2. A mold as described in claim 1, said inward projecting means comprising an oppositely disposed pair of vertical fins extending toward each other.

3. A mold for forming an ice lining in a vessel having a bottom wall, a continuous side wall, and a continuous top rim, comprising a hollow insert of flexible material adapted to fit within said vessel, said insert having a flange adapted to overlie said rim and provided with a groove adapted to engage said rim and hold the insert in position in the vessel, said insert having a continuous side wall and a bottom wall of such dimensions as to be spaced all around from the side wall and bottom wall, respectively, of the vessel when the insert is in position, the bottom wall of said insert being more flexible than its side wall and being adapted to flex upward to provide for expansion of the water below the insert in freezing, and a partition disposed across said insert and extending part way down toward the bottom wall thereof.

4. A mold for forming an ice lining in a vessel having a bottom wall, a continuous side wall, and a continuous top rim, comprising a hollow insert of flexible material adapted to fit within said vessel, said insert having a flange adapted to overlie said rim and provided with a groove adapted to engage said rim and hold the insert in position in the vessel, said insert having a continuous side wall and a bottom wall of such dimensions as to be spaced all around from the side wall and bottom wall, respectively, of the vessel when the insert is in position to form a chamber for containing water to be frozen, the bottom wall of said insert being more flexible than its side wall and being adapted to flex upward to provide for expansion of the water below the insert in freezing.

5. A mold as described in claim 4, the insert having vertical ribs on its side wall.

6. A mold as described in claim 4, said flange having a second groove opening upward and disposed above the groove adapted to engage said rim.

7. A mold as described in claim 4, said vessel having means adapted to overlie a portion of the ice lining formed in said chamber when water is frozen therein.

8. A mold as described in claim 4, said vessel having an internal bottom projection with a substantially horizontal hole communicating with said chamber.

References Cited in the file of this patent

UNITED STATES PATENTS

| | | |
|---|---|---|
| 763,732 | Dickson | June 28, 1904 |
| 1,123,537 | Huizer | Jan. 5, 1915 |
| 2,243,848 | Kitto | June 3, 1941 |
| 2,415,446 | Shoemaker | Feb. 11, 1947 |
| 2,440,753 | Mock | May 4, 1948 |
| 2,452,846 | Flynn | Nov. 2, 1948 |
| 2,550,633 | Zalkind | Apr. 24, 1951 |